United States Patent [19]

Steele, Jr.

[11] Patent Number: 6,115,811
[45] Date of Patent: Sep. 5, 2000

[54] DIGITAL DATA PROCESS SYSTEM INCLUDING EFFICIENT ARRANGEMENT TO SUPPORT BRANCHING WITHIN TRAP SHADOWS

[75] Inventor: Guy L. Steele, Jr., Lexington, Mass.

[73] Assignee: Sun Microsystems, Inc., Palo Alto, Calif.

[21] Appl. No.: 09/406,538

[22] Filed: Sep. 27, 1999

Related U.S. Application Data

[62] Division of application No. 08/866,098, May 30, 1997, Pat. No. 6,009,515.

[51] Int. Cl.[7] ....................................................... G06F 9/00
[52] U.S. Cl. .............................................. 712/244; 395/705
[58] Field of Search .................................... 712/230–239, 712/244, 227, 219, 228; 710/260–269; 395/704–709

[56] References Cited

U.S. PATENT DOCUMENTS

| | | | |
|---|---|---|---|
| 5,095,426 | 3/1992 | Senta ........................................ | 395/375 |
| 5,109,514 | 4/1992 | Garner et al. ............................ | 395/733 |

*Primary Examiner*—John A. Follansbee
*Attorney, Agent, or Firm*—Richard A. Jordan

[57] ABSTRACT

A digital computer includes an efficient mechanism by which an exception handler can traverse the instruction stream in a reverse direction to identify the instruction which gave rise to the exception condition after a discontinuity in an instruction stream. The digital computer is provided with both a program counter and an "old program counter." For points in an instruction sequence at which a discontinuity may occur, the "branch taken" portion of the instruction stream is provided with a predetermined type of instruction to enable the old program counter to be saved in a predetermined location. When the instruction is executed, the old program counter will contain a pointer to the "branch not taken" portion of the instruction sequence. When an exception condition is detected during processing of an "excepting" instruction, when an exception handler is called to locate the excepting instruction, when the exception handler performs a reverse traversal operation of the instruction sequence to locate the excepting instruction, if it encounters a read old program counter instruction (which can occur if there was a discontinuity in the instruction sequence), it can determine the location of the "branch not taken" portion of the instruction sequence by referencing the saved old program counter contents in the location identified by the read old program counter instruction.

9 Claims, 7 Drawing Sheets

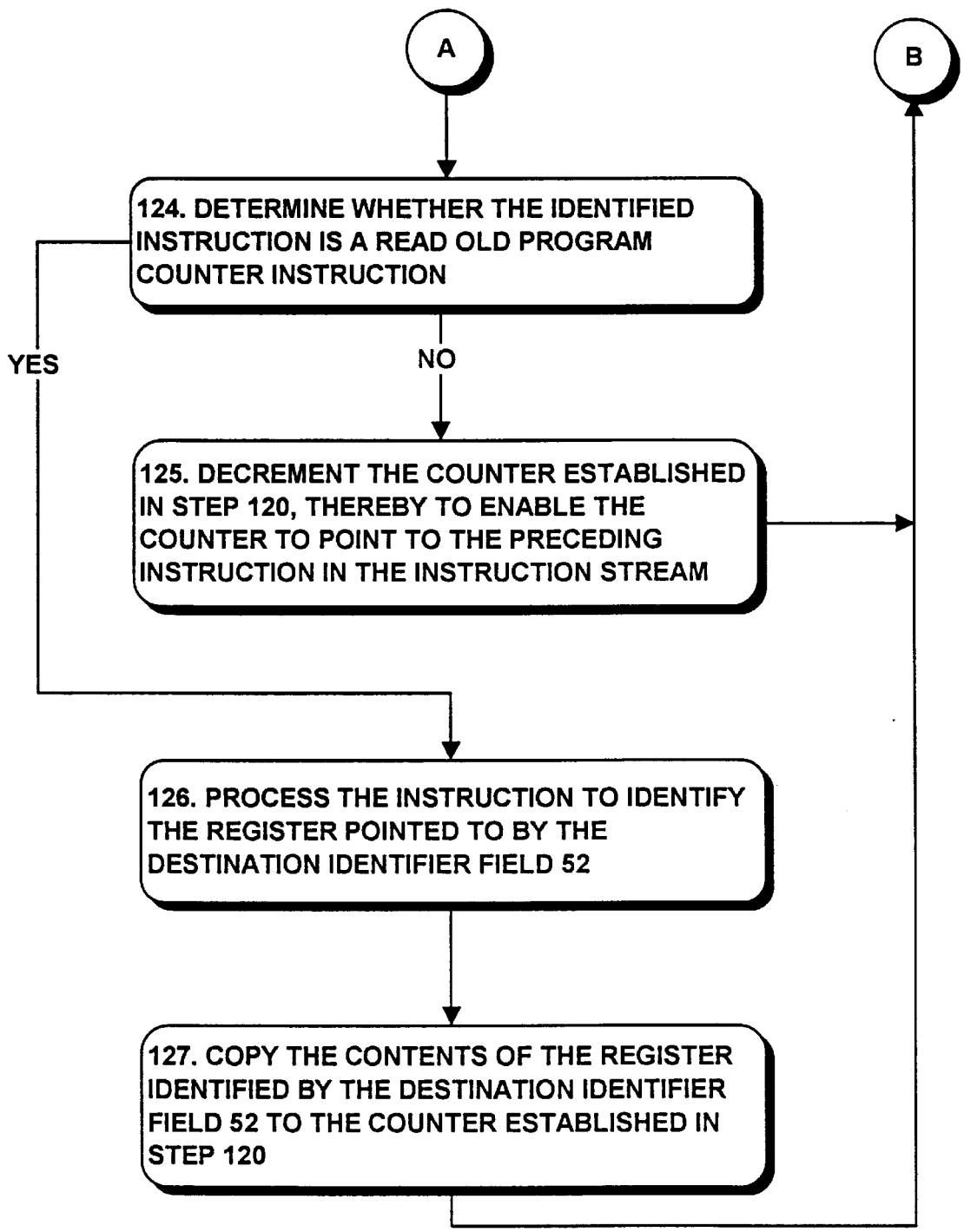
FIG. 7 (CONT. A)

DIGITAL DATA PROCESS SYSTEM INCLUDING EFFICIENT ARRANGEMENT TO SUPPORT BRANCHING WITHIN TRAP SHADOWS

This is a divisional of application Ser. No. 08/866,098 filed on May 30, 1997, now U.S. Pat. No. 6,009,515.

FIELD OF THE INVENTION

The invention relates generally to the field of digital computer systems, and more particularly to processors (including microprocessors) useful in such systems including arrangements to support branching within trap shadows.

BACKGROUND OF THE INVENTION

Processors used in digital computer systems process data in accordance with a series of instructions which comprise an instruction stream. Typically, each instruction will contain one or more elements, which can include, for example, an operation code that identifies the particular operation to be performed, one or more source operand specifier(s) which identify storage locations in the respective digital computer system which contain the data, or "operands," on which the operation is to be performed, and a destination identifier specifier which identifies a storage location in the system in which the processed data is to be stored. Some types of instructions may only comprise operation codes, particularly if they are provided to control the sequence of operations in the instruction stream, while other types of instructions also include the source and destination identifier specifiers.

Typically a processor performs a series of general phases in connection with processing of an individual instruction including:

(i) decoding the instruction's operation code to determine the type of operation to be performed, and coincidentally to identify the number of operands, if any;

(ii) if the instruction requires operands, retrieving the operands from the storage locations identified by the instruction;

(iii) performing the operation required by the instruction; and (iv) storing the result in the storage location identified by the instruction.

A processor could perform each of the above-identified phases in series for each successive instruction in the instruction stream in series, with very little if any overlap. In that case, for example, the processor would begin decoding the operation code of instruction (s+1) of the instruction stream (phase (i) above) after the result generated for instruction (s) of the instruction stream (phase (iv) above) has been stored.

Each of the phases (i) through (iv) can generally be performed by different circuit elements in a processor, and so so-called "pipelined" processors were developed in which each of the phases could be performed concurrently with the other phases, but for different instructions in the instruction stream. See, for example, Peter M. Kogge, *The Architecture Of Pipelined Computers* (McGraw-Hill Book Company, 1981) (hereinafter, "Kogge"). A pipelined processor may execute successive instructions in an instruction stream, in successive phases (i) through (iv), such that, while, for example, the processor is storing the result of (phase (iv) above) of instruction (s), it will concurrently be (a) performing the operation required by instruction (s+1) in connection with its operands (phase (iii) above), (b) retrieving the operands required by instruction (s+2) (phase (ii) above), and (c) decoding the operation code of instruction (s+3) (phase (i) above).

It will be appreciated that, if a sequence of four instructions (s) through (s+3) in an instruction stream can be processed concurrently in this manner, the instructions can be processed in seven time steps rather than the sixteen time steps that would be necessary in a non-pipelined processor. In many cases, sequences of instructions from an instruction stream can be executed in this manner, which can lead to substantially reduced processing time and increased through-put. As described in Kogge, processors having a variety of other, more complex pipelines have been developed.

Problems can arise, however, in connection with pipelined execution of instructions. During processing, unusual conditions variously known as "faults," "traps" or "exceptions" (generally "exceptions") may be encountered which need to be handled. A number of types of exceptions may arise during processing. The specific types of exceptions are generally determined by the particular architecture which defines the operation of a particular type of processor; the types of exceptions that are provided for one particular type of microprocessor, which is constructed in accordance with the SPARC Version 9 architecture, is described in the SPARC International, Inc [David L. Weaver and Tom Germond (eds)], *The SPARC Architecture Manual Version 9* (Prentice-Hall, 1994) (hereinafter referred to as "the SPARC Architecture Manual, Version 9"), chapter 7.

When a processor detects an exception in connection with processing of an instruction, it calls an exception handler to process the exception, that is, to perform selected operations as required by the exceptional condition. Two general methodologies have been developed for handling exception conditions. In one methodology, which is representative of computers whose processors follow a "precise" exception handling model, if an exception condition is detected during processing of an instruction, the exception handler is invoked immediately following operations performed for the instruction. On the other hand, in a second methodology, which is representative of processors whose architectures specify a "delayed" exception handling model, if an exception is detected during processing of an instruction, the exception handler is not invoked until some point after the processor has sequenced to processing an instruction after the instruction for which the exception was indicated. Some architectures make use of both the precise and delayed exception handling models for different types of exceptions.

In both methodologies, the processor will generally need to retain certain exception status information, perhaps for some time, after the instruction for which an exception condition is detected so that, when the exception handler is invoked, it has the information which it needs to process the exception. One benefit of the handling exception conditions according to the precise exception handling model is that, since the exception handler is processed immediately after the processing of the instruction which gave rise to the exception condition, the exception status information needed by the exception handler will be directly available and need not be saved beyond processing for the program instruction which gave rise to the exception condition.

With exceptions handled according to the delayed exception handling model, however, the processor will generally need to ensure that certain exception status information be retained, perhaps for some time, after the floating point instruction for which an exception condition is detected so that, if the exception handler is eventually invoked, it has the information which it needs to process the exception. The instruction which causes an exceptional condition which is handled according to the delayed exception handling model casts a "trap shadow" over subsequent instructions in the instruction stream, the trap shadow representing the time following the execution phase of an instruction, to the point at which if an exception condition would have occurred in connection with processing of the instruction, the exception condition would actually have occurred. Otherwise stated, if an exception condition is detected in connection processing of an instruction, the exception condition will have been detected by the end of the trap shadow. Different types of instructions can have trap shadows of different lengths, but generally the length of an instruction's trap shadow can be predicted a fortiori based on the type of processing operation to be performed while the instruction is being executed.

To accommodate pipelining in such an environment, the programmer (in the case of a program written in assembly language) or compiler (in the case of a program written in a high-level language), will need to ensure that instructions in the instruction stream which follow an instruction which may cause a trap will obey certain restrictions, which will allow the trap handler, when called, to identify the particular instruction which gave rise to the exception condition, handle the exception condition by emulating the instruction or otherwise compensate for the exception condition, and then re-execute the remaining instructions of the trap shadow. The restrictions include such rules as:

(i) no instruction in the trap shadow may enable data to be stored in a register that is read in response to another instruction in the trap shadow; that is, no instruction in the trap shadow may have a destination identifier which identifies a register that is also identified by the source operand of another instruction in the trap shadow;

(ii) no two instructions in the trap shadow may enable data to be written to the same register; that is, no two instructions in the trap shadow may have destination identifiers which identify the same register; and (iii) no instruction in the trap shadow may enable a jump, branch, or similar discontinuity in the processing of the series of instructions in the instruction stream.

Generally, when the computer begins processing the exception handler, it will store the state of the computer at the point in time at which the exception handler begins, which will, in a pipelined computer, reflect at least some operations that are performed in executing instructions in the various stages of the pipeline after the instruction that gave rise to the exception condition and before the exception handler is called. When the exception handler finishes handling the exception handler, it will effectively retrace the operations performed in processing the instructions in the pipeline so that it will be able to place the computer in an appropriate state so that it can resume processing the instructions in the instruction stream. These restrictions will ensure that the exception handler will be able to return the computer to the appropriate state.

The third restriction, that is, that no instruction in the trap shadow may enable a discontinuity in the processing of the series of instructions in the instruction stream, requires that an assembly language programmer (if the program is being written in the assembly language of the particular processor on which the program is to be processed) or the compiler (if the program is being written in a high-level language) ensure that trap shadows of instructions that might cause exceptions are cut off before an instruction is executed which can result in a discontinuity in instruction processing. This can present a particular problem in connection with loops which are commonly used. In a loop, a particular instruction sequence can be executed a number of times, the number depending on detection of a selected processing condition. Generally, the end of the instruction sequence is a conditional branch instruction which determines whether the processing condition has occurred. If the processing condition has not occurred, the conditional branch instruction enables a branch to occur which enables processing beginning with the start of the instruction sequence. On the other hand, if the processing condition has occurred, the conditional branch instruction enables the next instruction in the instruction stream after the loop to be processed. Loops are commonly encountered in an instruction stream, and the third restriction can result in a significant problem, particularly in short loops where an instruction's trap shadow may extend to and beyond the conditional branch instruction.

To accommodate the restrictions noted above, particularly the third restriction, some architectures provide for a particular instruction, called a "trap barrier" instruction, which the programmer or the compiler can insert into the instruction stream at some point after respective instructions which can result in exceptional conditions which can serve to cut off trap shadows, and prior to an instruction which causes a discontinuity in processing of the instructions in the instruction stream to ensure that, in particular, the third, restriction above is observed. Problems arise, however, in connection with use of the trap barrier instruction. The trap barrier instruction effectively stalls processing of instructions in the pipeline after the trap barrier instruction, including the instruction which causes the discontinuity as well as instructions subsequent thereto, until the processor has completed processing of the instructions preceding the trap barrier instruction, at least to a point at which it (that is, the processor) can determine whether the exceptional condition can be detected in connection with processing of instructions preceding the trap barrier instruction, that is, until the end of the trap shadows of all of the instructions preceding the trap barrier instruction in the pipeline. Since each trap barrier instruction in the instruction stream "stalls" the pipeline whether or not an exceptional condition is detected, it can result in a significant decrease in the processing performance that may otherwise be provided by the pipelining of the processor, particularly in connection with loops and other discontinuities in the instruction stream.

SUMMARY OF THE INVENTION

The invention provides a new and improved digital data processor including an arrangement to support branching within trap shadows, which obviates the necessity of stalling the execution pipeline ahead of instructions which may cause a branch, jump or other discontinuity in processing instructions in the instruction sequence. More specifically, the invention provides an arrangement for facilitating a branch, jump or other discontinuity in a trap shadow in a pipeline, without the need for stalling the pipeline prior to the point at which the discontinuity may occur, by providing an efficient mechanism by which an exception handler can traverse the instruction stream in a reverse direction to identify the instruction which gave rise to the exception condition after a discontinuity in the instruction stream.

In brief summary, the invention in one aspect provides an arrangement for use in connection with a digital computer, for facilitating a branch, jump or other discontinuity in a trap shadow in a pipeline, without the need for stalling the pipeline prior to the point at which the discontinuity may occur, by providing an efficient mechanism by which an exception handler can traverse the instruction stream in a reverse direction to identify the instruction which gave rise to the exception condition after a discontinuity in the instruction stream. The digital computer is provided with both a program counter, which stores a pointer to the instruction currently being executed (generally, the instruction which is in the instruction decode phase of the pipeline), and an "old program counter," which stores a pointer to the prior instruction (that is, the instruction which was previously in the instruction decode phase). For points in an instruction sequence at which a branch, jump or other discontinuity may occur, the "branch taken" portion of the instruction stream is provided with a "read old program counter" instruction, which enables the contents of the old program counter to be saved in a predetermined location (such as a register in the computer's general purpose register set) as specified in the instruction. When the read old program counter instruction is executed, the old program counter will contain a pointer to the "branch not taken" portion of the instruction sequence. Thus, when an exception condition is detected in connection with processing of an "excepting" instruction, when an exception handler is called to locate the excepting instruction and process the exception condition, when the exception handler performs a reverse traversal operation of the instruction sequence to locate the excepting instruction, if it encounters a read old program counter instruction (which can occur if there was a discontinuity in the instruction sequence), it can determine the location of the "branch not taken" portion of the instruction sequence by referencing the saved old program counter contents in the location identified by the read old program counter instruction.

In another aspect, the invention provides a compiler, assembler or other arrangement for generating program code that includes a read old program counter instruction, at points in the instruction sequence at which a jump, branch or other discontinuity can occur.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
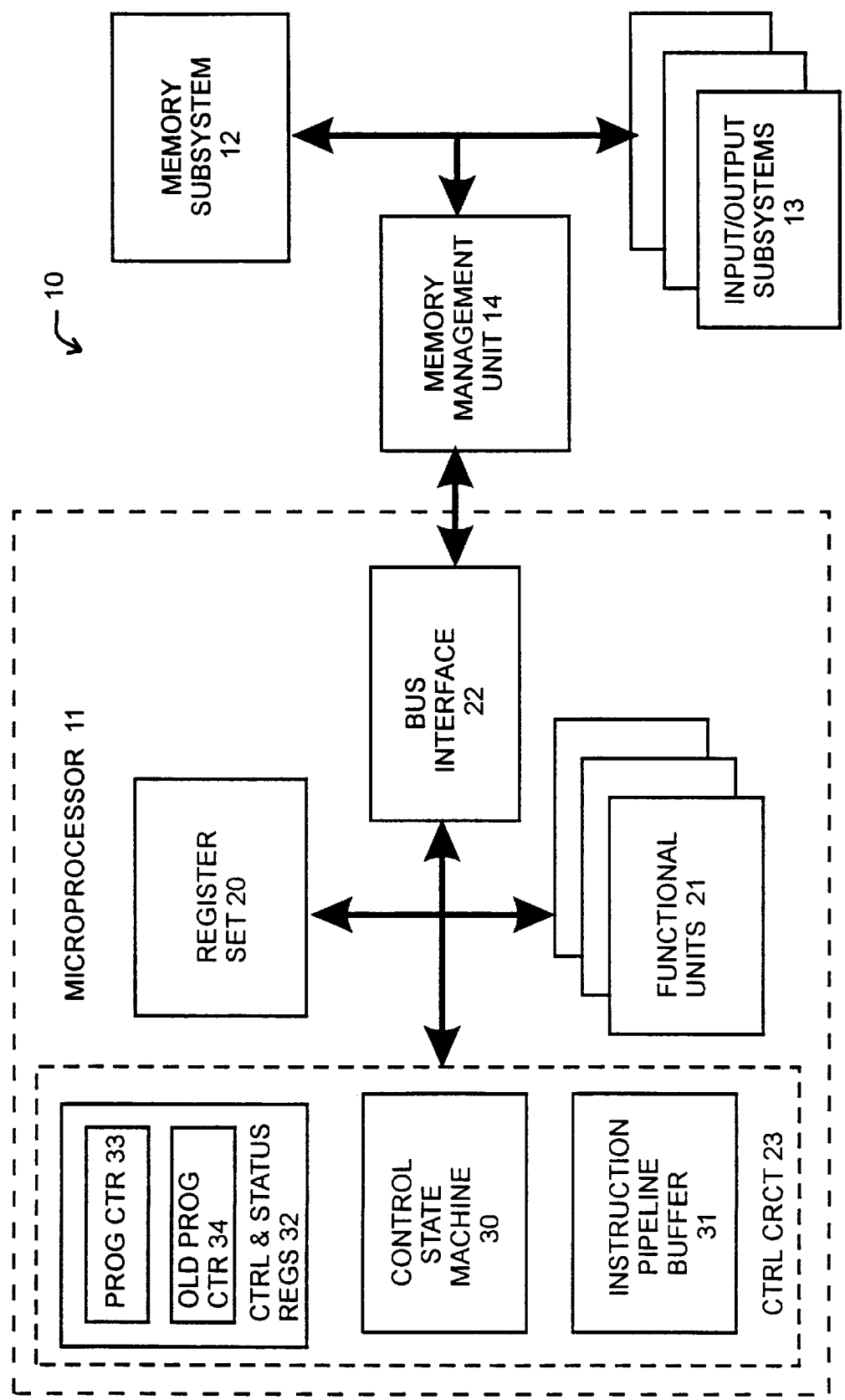
FIG. 1 is a functional block diagram of a digital computer system including a pipelined microprocessor which provides for improved trap shadow handling in connection with a partial trap barrier instruction, constructed in accordance with the invention.

FIG. 1 is a functional block diagram of a digital computer system 10 including a pipelined microprocessor 11 which provides for improved trap shadow handling constructed in accordance with the invention. With reference to FIG. 1, the digital computer system 10 includes the microprocessor 11, which communicates with a memory subsystem 12 and one or more input/output subsystems generally identified by reference numeral 13 through a memory management unit 14. The memory subsystem 12 includes a number of physical addressable storage locations in which data and instructions (which will be referred to collectively herein as "information") to be processed by the microprocessor 11 may be stored. In addition, the microprocessor 11, after processing data, may transfer the processed data to the memory subsystem 12 for storage.

The digital computer system 10 may include a number of diverse types of input/output subsystems 13, including mass storage subsystems, operator input and output subsystems, network ports and the like. The mass storage subsystems generally provide long-term storage for information which may be processed by the microprocessor 11. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the microprocessor 11, information stored in the mass storage subsystems may be transferred to the memory subsystem 12 for storage. After the information is stored in the memory subsystem 12, the microprocessor 11 may retrieve it from the memory subsystem 12 for processing. After the processed data is generated, the microprocessor 11 may also enable the mass storage subsystems to retrieve the processed data from the memory subsystem 12 for relatively long-term storage.

The operator input and output subsystems generally provide an operator interface to the digital computer system 10. In particular, the operator input subsystems may include, for example, keyboard and mouse devices, which an operator may use to interactively input information to the digital computer system 10 for processing. In addition, the operator input subsystems may provide mechanisms whereby the operator may control the digital computer system 10. The operator output subsystems may include devices such as video display devices, through which the digital computer system 10, under control of the microprocessor 11, displays results of processing to the operator. In addition, a printer may be provided to provide a hardcopy output for the operator.

The network ports may enable the digital computer system 10 to connect to a communication link, thereby connecting the computer system 10 in a computer network. The network ports enable the computer system 10 to transmit information (including both program instructions and data) to, and receive information from, other computer systems and other devices in the network (not shown). In a typical network organized according to, for example, the client-server paradigm, certain computer systems in the network are designated as servers, which store information for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As is conventional, each of the input/output subsystems 13 will typically include registers and other data storage elements (not shown) which store control, status and other information which are used to control the operations performed by the respective input/output subsystem 13 and to indicate its operational status. The microprocessor 11 may store information in the registers and other data storage elements, thereby to control the respective input/output subsystem 13, in a manner similar to the manner in which it stores information in the memory subsystem 12. Similarly, the microprocessor 11 may retrieve the information contained in the input/output subsystem 13, in a manner similar to the manner in which it retrieves information in the memory subsystem 12, to ascertain the operational status of the respective input/output subsystem 13.

The memory management unit 14 performs a number of operations. In particular, the memory management unit 14 typically includes a memory cache, which caches information requested by the microprocessor 11 from the memory subsystem 12. In addition, as is typical, when the microprocessor 11 requests information to be retrieved from, for example, the memory subsystem 12, or provides processed data for storage in, for example, the memory subsystem 12, the microprocessor 11 will provide an address in a virtual address space to the memory management unit 14. The various application programs processed by the microprocessor 11 may be provided with respective virtual address spaces. The virtual address space is divided into "pages," each of which comprises a selected number of virtual addressable storage locations, with each virtual addressable storage location storing information. The pages of an application program's virtual address space are normally stored on a mass storage subsystem, and the microprocessor 11 enables individual ones of the pages to be copied to the memory subsystem 12 as they are needed during processing, and for those pages that are modified during processing the microprocessor 11 may enable them to be copied to the mass storage subsystem for long-term storage.

Respective pages of a virtual address space may be compactly stored in physical locations in the memory subsystem 12, which are identified by physical addresses, and in performing an access operation in connection with a particular virtual address space location (that is, a retrieval of information from or a storage of information in a particular physical location) in response to a request from the microprocessor 11, the memory management unit 14 will perform a translation of the virtual address to obtain the physical address for use in performing the access operation in connection with the memory subsystem 12. In addition, the memory management unit 14 may perform several checking operations, including checking to determine whether or not the page is in the memory subsystem 12, whether or not the application program has permission to access (that is, read data from or write data into) the page, and whether or not the requested page is a valid page in the virtual address space, and the like. If the memory management unit 14 makes a negative determination in the checking operation, that is, if it determines, for example, that the page is not in the memory subsystem 12, that the application program does not have the appropriate access permission, or if it determines that the requested page of the virtual address space page is not a valid page in the application program's virtual address space, it may generate an ACCESS FAULT indication, which the microprocessor 11 may receive and use in performing selected fault handling operations.

In one embodiment, a microprocessor 11 useful in system 10 comprises a microprocessor constructed in accordance with the SPARC Version 9 architecture described in the SPARC Architecture Manual, Version 9. The microprocessor 11 processes instructions in a pipelined manner, as will be described below in connection with FIG. 2. The microprocessor 11 generally includes a number of elements, including a register set 20, one or more functional units 21, a bus interface 22 and a control circuit 23. The control circuit 23 controls the processing operations as performed by the microprocessor 11 under control of instructions provided by a program. Generally, under control of the control circuit 23, the bus interface 22, cooperating with the memory management unit 14, retrieves instructions and data from the memory subsystem 12 or data storage elements maintained by particular input/output subsystems 13 for processing and loads the retrieved data into registers in the register set 20. Also under control of the control circuit 23, the functional units 21 perform logical, integer and floating point arithmetic, and other processing operations in connection with data which the control circuit 23 enables to be transferred thereto from the register set 20, to generate processed data which will be transferred to the register set 20 for storage. The control circuit 23 may also enable the bus interface 22, also cooperating with the memory management unit 14, to transfer processed data from the register set 20 to the memory subsystem 12 or data storage elements maintained by particular input/output subsystems 13 for storage. In a microprocessor constructed in accordance with the SPARC Version 9 architecture, transfer of data between registers comprising the register set 20, on the one hand, and the memory subsystem or a particular one of the input/output subsystems 13 is controlled by particular load (in the case of transfers to the registers) and store (in the case of transfers from the registers) instructions.

Figure 2:
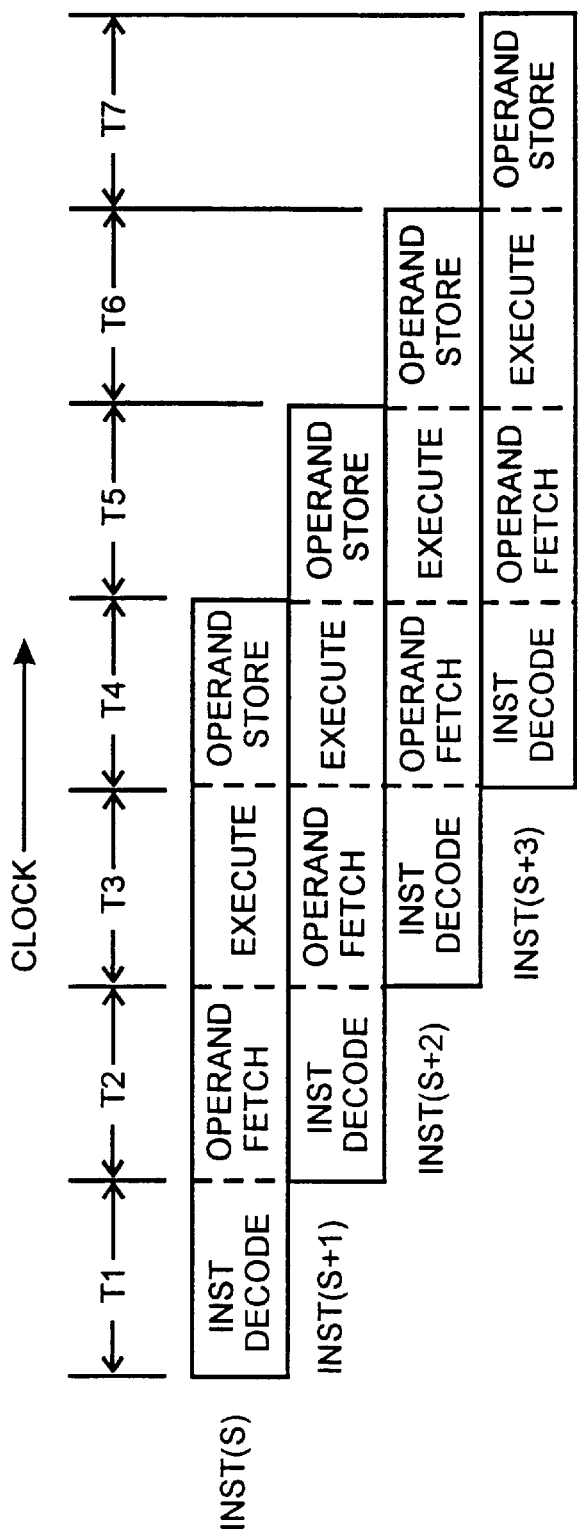
FIG. 2 is a timing diagram illustrating phases of execution of instructions in a pipelined manner.

The invention provides an arrangement whereby the microprocessor 11, which executes instructions in a pipelined manner, will be able to efficiently accommodate jump, branch and similar instructions (generally, instructions which can enable a discontinuity of instruction processing in an instruction stream), within trap shadows. Before proceeding further, it would be helpful to describe pipelined execution of instructions in an instruction stream. With reference to FIG. 2, in pipelined execution, the microprocessor 11 executes instructions in, for example, four general phases, namely:

(i) an instruction decode phase ("INST DECODE") during which it decodes the operation code to determine the type of operation to be performed, and coincidentally to identify the number of operands, if any;

(ii) an operand fetch phase ("OPERAND FETCH") during which, if the instruction requires operands, it retrieves the operands from the storage locations identified by the instruction;

(iii) an execute phase ("EXECUTE") during which the operation required by the instruction is performed; and (iv) a result storage phase ("OPERAND STORE") during which, if the instruction enables the microprocessor 11 to generate result data, the microprocessor stores the generated result data in the particular storage location identified by the instruction.

These phases are generally controlled by the control circuit 23 (FIG. 1).

Figure 3:
FIG. 3 is a diagram illustrating the format of a new instruction, termed herein a "read old program counter" instruction, useful in the invention.

FIG. 2 depicts the timing with which the microprocessor 11 executes phases (i) through (iv) of successive instructions INST(S) through INST(S+3) in its pipeline during successive ticks T1, T2, . . . (generally "Ti") of a clock signal (not shown). Since the microprocessor 11 has a four-phase pipeline, it can have four instructions in the pipeline at any point in time. In addition, the microprocessor can be in the process of fetching the next instruction INST(S+4) (not shown) in the instruction stream, from, for example, the memory subsystem 12 or from a cache (not shown), which can be added to the pipeline when it has finished execution of instruction INST(S). As shown in FIG. 3, during each clock tick Ti, the microprocessor can be performing a different one of the phases (i) through (iv) for each of the respective instructions INST(S) through INST(S+3) in the pipeline. For example, during the result storage phase (phase (iv)) for instruction INST(s), during which the destination register of register set 20 stores the result data generated during execution of instruction INST(S) (represented by the block labeled "OPERAND STORE") during clock tick T4, concurrently (a) the functional units 21 will perform the operation required by the next instruction INST(S+1) (phase (iii) above) in connection with its operands during the execute phase (represented by the block labeled "EXECUTE") of that instruction INST(S+1), (b) the source register(s) of register set 20 will provide the operands required by the next instruction INST(S+2) (phase (ii) above) during the operand fetch phase (represented by the block labeled "OPERAND FETCH") of that instruction INST(S+2), and (c) the instruction INST(S+3) will be decoded (phase (i) above) during the instruction decode phase (represented by the block labeled "INST DECODE") of that instruction INST(S+3) to identify the operation to be performed and the source register(s), if any, to be used to provide the operands, all during the same clock tick T4. Similar operations can occur for each instruction in the instruction stream, as long as the pipeline does not stall. Although in FIG. 2, the time required to perform all of the phases is depicted as being the same for the illustrative instructions INST(S) through INST (S+3), it will be appreciated that the time for performing particular phases may differ as among different instructions and different types of instructions; for example, the time required to perform the EXECUTE phase will normally differ as between integer instructions and floating point instructions, and, indeed, may differ as among different types of floating point instructions. In addition, the time required to execute load and store instructions may differ significantly from the time required to perform other types of instructions.

Furthermore, the particular operations described in connection with each of the phases may differ among different types of instructions. For example, certain types of instructions do not have source operands, in which case the OPERAND FETCH phase may be skipped and the EXECUTE phase may be performed in the second phase instead of the third phase. In addition, certain types of instructions do not have destination identifiers in which case the OPERAND STORE phase may be skipped. Furthermore, for types of instructions relating to, for example, copying of information from one register to another, which may not require use of a functional unit 21, can be accomplished in a single phase after the INST DECODE phase (which may be termed an OPERAND FETCH/STORE) phase, without requiring an EXECUTE phase and separate OPERAND FETCH and OPERAND STORE phases; it will be appreciated, however, that it will be desirable for such an information copy instruction to ensure that, if the register from which information is to be transferred is the destination of an earlier instruction in the instruction stream, the microprocessor 11 has completed the OPERAND STORE phase of the earlier instruction before the information copy instruction is executed.

Returning to FIG. 1, the control circuit 23 includes a control state machine 30, an instruction pipeline buffer 31 and a miscellaneous state and control registers 32. Generally, the control state machine 30 generates control signals which are provided to control other elements of the microprocessor 11. The control state machine 30 generates the control signals in response to instructions in the instruction pipeline buffer 31 and state information in the miscellaneous state and control registers 32.

The instructions in the pipeline are retrieved from an instruction source, such as an instruction cache (not separately shown) or the memory subsystem 12 (FIG. 1), and loaded into the instruction pipeline buffer 31. The instruction pipeline buffer 31 effectively forms a FIFO (first-in, first-out) buffer, including a plurality of entries, each of which will store an instruction in the pipeline. The entries provide respective signals which are based on the particular instruction therein, which serve to control the control state machine 30 in connection with execution of the respective instruction. In a microprocessor which implements a four-phase pipeline as illustratively described above, the instruction pipeline buffer 31 will generally have four entries, one for each instruction which may be in the pipeline at any particular time. As the control circuit 23 finishes processing of an instruction INST(S), which will be located in the last entry in the instruction pipeline buffer 31, the other instructions INST(S+1) through INST(S+3), respectively located in sequential entries in the FIFO buffer, can each sequence to respective next entries and a new instruction INST(S+4) can be retrieved from the instruction source and loaded in the first entry of the instruction pipeline buffer 31.

The microprocessor 11 includes an arrangement for facilitating a branch, jump or other discontinuity in a trap shadow in a pipeline, without the need for stalling the pipeline prior to the point at which the discontinuity may occur, by providing an efficient mechanism by which an exception handler can traverse the instruction stream in a reverse direction to identify the instruction which gave rise to the exception condition after a discontinuity in the instruction stream. To accommodate this arrangement, the miscellaneous state and control registers 32 includes both a program counter 33 and an old program counter 34, both of which are in the form of registers. The program counter 33 contains a pointer to the location in the virtual address space of the program currently being processed, of the instruction currently beginning execution, in particular, virtual address space location of the instruction which is in the first entry of the instruction pipeline buffer 31 and which is in the first, instruction decode, phase of the pipelined execution. The old program counter 34, on the other hand, contains a pointer to the location in the virtual address space of the previous instruction in the instruction stream, that is, the instruction which is in the second entry of the instruction pipeline buffer and which is in the second phase of pipelined execution. Generally, except when there is a jump, branch or other discontinuity in processing of instructions in the instruction stream, when the control state machine 30 will enable the program counter to increment to point to successive locations in the program's virtual address space. In that case, the program counter 33 will point to the next virtual address space location after the location pointed to by the old program counter 34. However, if an instruction is encountered that enables a jump, branch or other discontinuity, when the instruction is executed, the program counter 33 will normally not point to the next location after that pointed to by the old program counter 34, but instead the program control 32 will point to a location displaced from the location pointed to by the old program counter 34 by an amount required to accommodate the jump, branch or other discontinuity.

To further accommodate the arrangement in accordance with the invention, the microprocessor 11 is provided with a type of instruction termed herein a "read old program counter" instruction. The read old program counter instruction may be provided by a compiler, assembler or assembly language programmer to enable the contents of the old program counter 34 to be saved, generally in a register in register set 20, the particular register being identified as a destination identifier in the instruction. The format of the read old program counter instruction used in one embodiment is depicted in FIG. 3. With reference to FIG. 3, the read old program counter instruction, identified by reference numeral 50, includes two fields, namely, an operation code field 51 and a destination identifier field 52, and may also include a third field identified in FIG. 3 as miscellaneous field 53. The operation code field 51 contains a value that identifies the instruction as a read old program counter instruction, and the destination identifier field 52 identifies the particular register in register set 20 in which the contents of the old program counter 34 are to be copied, thereby to save the contents for future use as described below. It will be appreciated that, when the read old program counter instruction 50 is executed, the old program counter 34 points to the location in the virtual address space of the instruction being executed in the execution pipeline just prior to the read old program counter instruction.

The miscellaneous field 53 may comprise, for example, padding, if the instructions executed by the microprocessor 11 are of uniform size, that is, all have the same number of bits, and the size of the operation code field 51 and destination identifier field 52, taken together, are less than that number.

Figure 4:
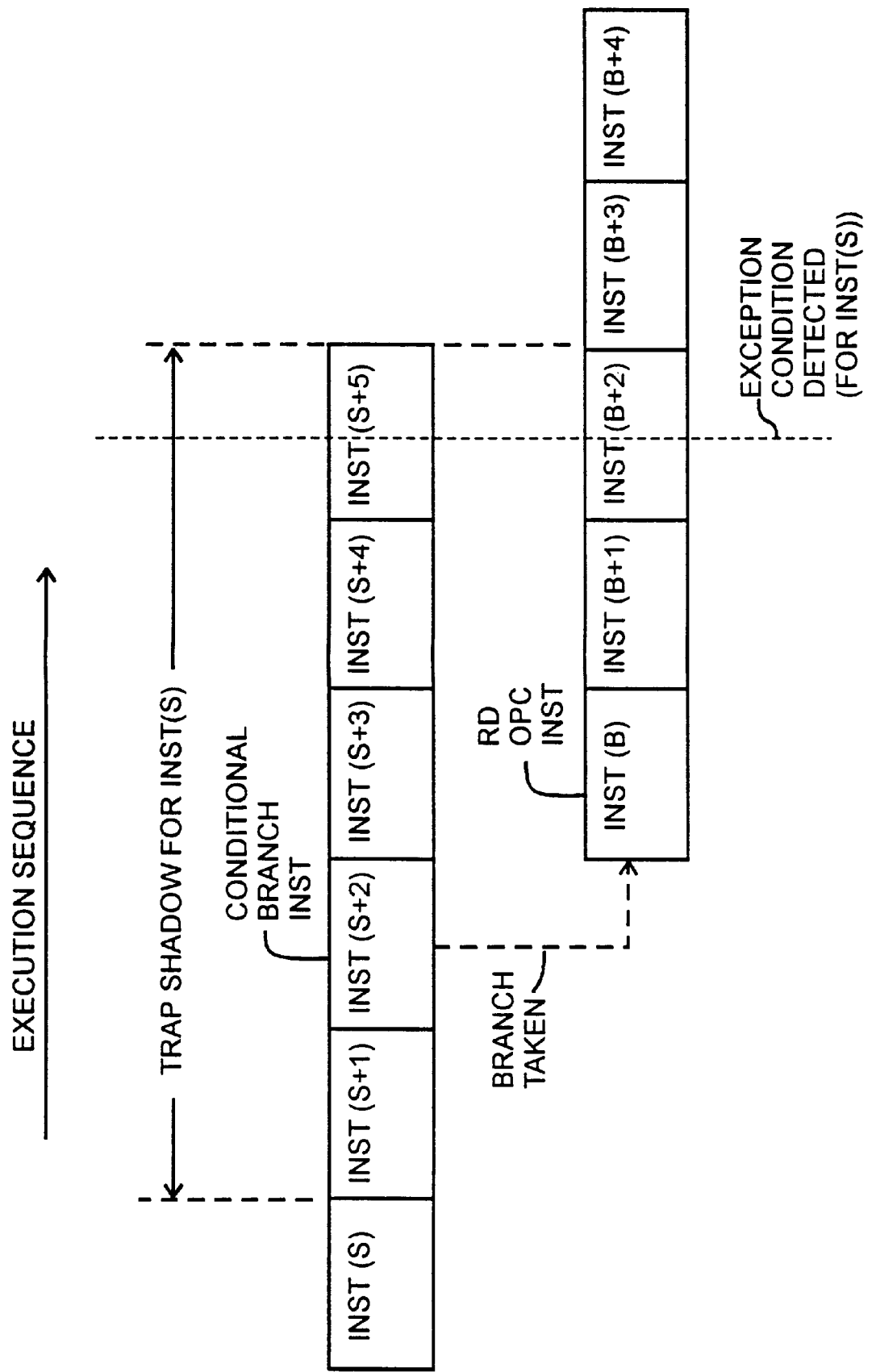
FIG. 4 is a diagram illustrating a trace of an illustrative instruction stream, useful in understanding the invention.

The usage of the read old program counter instruction 50 will be described in connection with FIG. 4. FIG. 4 depicts a trace or time line of execution of instructions in an illustrative portion of an instruction stream. In the trace depicted in FIG. 4, pipelining effects are ignored for clarity. The illustrative instruction stream portion depicted in FIG. 1, the microprocessor 11 will begin execution with instruction INST(S), and proceed with successive instructions INST(S+1), INST(S+2) and so forth. Instruction INST(S+2) is assumed to be a "conditional branch" instruction, which will enable a branch, or discontinuity, to another section of the illustrative instruction stream portion, beginning with instruction INST(B), if one or more predetermined conditions exist at the time the conditional branch instruction is executed. On the other hand, if the predetermined condition (s) does (do) not exist at the time the conditional branch instruction is executed, the branch will not be taken, in which case execution will continue along the main path with instruction INST(S+3).

As will be appreciated by those skilled in the art, a conditional branch instruction can be used, for example, in a loop, wherein a sequence of instructions A, B, . . . , "I," is executed through one or more iterations, with execution of the sequence being terminated when a predetermined condition exists. In that case, the sequence will include, at or proximate instruction "I," a conditional branch instruction to enable the microprocessor 11 to test the predetermined condition and sequence to the next instruction I+1 if the condition does not exist. On the other hand, if the predetermined condition does exist when the microprocessor 11 executes the conditional branch instruction, it (that is, microprocessor 11) will branch to return to the beginning of the loop, with instruction A, and repeat execution of the loop for a subsequent iteration. In the illustrative instruction stream whose trace depicted in FIG. 4, if the instructions form at least part of a loop, the instructions INST(B), . . . , INST (B+4) form the instruction sequence at the beginning of the loop, and instructions INST(S), . . . , INST(S+2) form the instruction sequence at the end of the loop. In that case, if the microprocessor 11 determines that the predetermined condition exists during execution of the conditional branch instruction INST(S+2) during an iteration, it (that is, the conditional branch instruction INST (S+2)) will enable a branch to instruction INST(B), thereby to enable the microprocessor to execute the loop for another iteration, as represented by the arrow having the legend "BRANCH TAKEN." On the other hand, if the microprocessor 11 determines that the predetermined condition does not exist during execution of the conditional branch instruction INST (S+2) during an iteration, it (that is, the conditional branch instruction INST(S+2)) will not enable a branch, so that the microprocessor 11 will process the next instruction INST (S+3), thereby to leave processing of the instructions in the loop.

In the illustrative instruction stream whose trace is depicted in FIG. 4, instruction INST(S) casts an illustrative trap shadow over five instructions as indicated by "TRAP SHADOW FOR INST(S)." Accordingly, an exceptional condition may be detected in connection with execution of instruction INST(s) any time during the execution of instruction INST(S) or any of the next five instructions executed by the microprocessor 11. If such an exception condition is detected, an exception handler will be called to handle the exception. As part of its processing, the exception handler will examine the instruction stream from the point at which it is called, in reverse order to locate the instruction INST(S) that gave rise to the exception condition. If the exception condition is detected during processing of instructions INST (S+1) through INST(S+5), in the sequence of instructions in successive locations in the virtual address space after the location that contains instruction INST(S), the exception handler can readily identify the sequence of instructions, in reverse order to locate the instruction INST(S) that gave rise to the exception condition by decrementing the program counter 33.

If the condition exception is detected during processing of instructions INST(B) through INST(B+2) of the "branch taken" portion of the instruction stream, providing that instruction INST(B) comprises a read old program counter instruction 50 will enable the exception handler to locate the instruction INST(S) which gave rise to the exception condition. From the above, it is apparent that, when the read old program counter instruction 50 is executed as instruction INST(B), the microprocessor 11 will save the contents of the old program counter 34 in a register in register set 20 identified by the destination identifier field 52 of the instruction 50. At that point, the program counter 33 will point to the instruction INST(B), that is, the read old program counter instruction, and the old program counter 34 will point to the previously-executed instruction in the instruction stream, that is, the conditional branch instruction INST (S+2). Thus, when the exception handler reaches instruction INST(B) in its reverse order traversal of the instruction stream, since the instruction is a read old program counter instruction, it (that is, the exception handler) can determine that the next previous instruction in the instruction stream is pointed to by the saved contents of the old program counter 34 in the register identified by the destination identifier field 52. Thereafter, the exception handler can continue its reverse order traversal of the instruction stream from the instruction pointed to by the saved contents of the old program counter 34. Effectively, the read old program counter instruction provides a link for the exception handler from a "branch taken" portion of the instruction stream, to the other "branch not taken" portion of the instruction stream, in its (that is, the exception handler's) reverse order traversal of the instruction stream.

Corresponding operations occur in connection with instruction sequences which include instructions enabling branches, jumps or discontinuities under other circumstances.

The read old program counter instruction may be inserted into an instruction sequence by a compiler while compiling a program written in a high-level language, by an assembler while assembling a program written in an assembly language, or directly by a programmer while developing a program. Operations performed by a compiler or assembler (which will be collectively referred to as a "compiler") in inserting a read old program counter instruction will be described in connection with the flowchart depicted in FIG. 5. In the operations depicted in FIG. 5, it will be assumed that, for a branch, jump or other discontinuity, the compiler will determine whether the "branch taken" portion of the instruction stream is in the trap shadow of an instruction in the portion of the instruction sequence ahead of the "branch not taken" portion of the instruction stream, before it (that is, the compiler) inserts a read old program counter instruction in the "branch taken" portion of the instruction sequence. It will be appreciated that, alternatively, the compiler can insert a read old program counter instruction in the "branch taken" portion of the instruction sequence without determining whether any of the "branch taken" portion of the instruction sequence is in the trap shadow of an instruction in the portion of the instruction sequence ahead of the "branch not taken" portion of the instruction sequence, in which case a read old program counter instruction will be executed for each branch, jump or other discontinuity in the instruction sequence.

Figure 5:
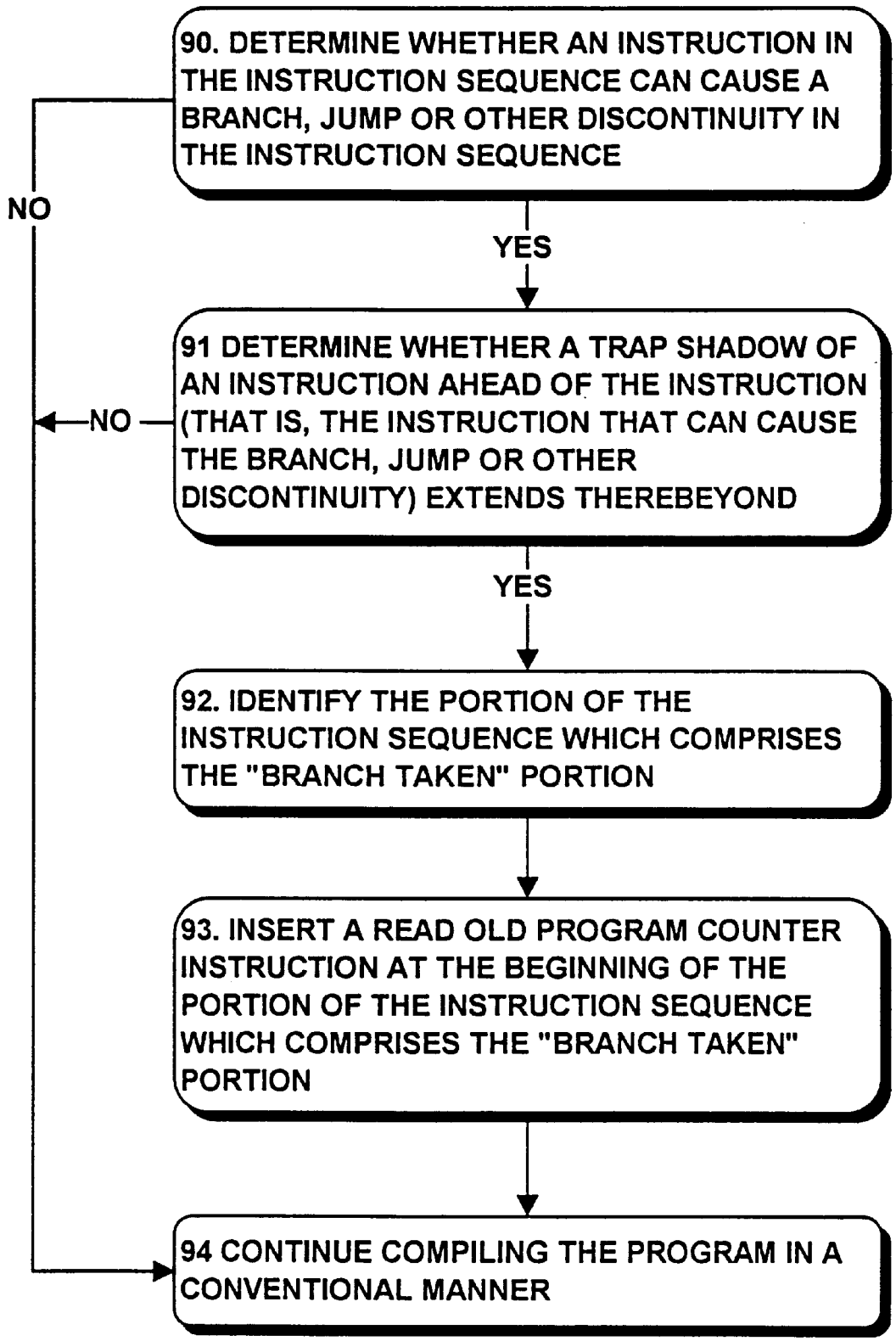
FIG. 5 is a flow diagram illustrating operations performed by a compiler or assembler in generating program code including a read old program counter instruction in connection with a jump, branch or other discontinuity in a program.

In any case with reference to FIG. 5, when the compiler determines that an instruction in the instruction sequence, such as the conditional branch instruction (instruction INST (S+2)) described in connection with FIG. 4, can cause a branch, jump or other discontinuity in the instruction sequence (step 90), it (that is, the compiler) can determine whether a trap shadow of an instruction ahead of that instruction in the instruction sequence extends therebeyond (step 91). The compiler can keep track of trap shadows of the instructions in the program that it is compiling using any conventional tracing arrangement. If the compiler makes a positive determination in step 91, it will identify the portion of the instruction sequence which comprises the "branch taken" portion (step 92), and insert a read old program counter instruction at the beginning thereof (step 93). Thereafter, the compiler will continue compiling the program in a conventional manner (step 94).

Returning to step 91, if the compiler makes a negative determination in that step, which will occur if no trap shadow of instructions ahead of the instruction being processed by the compiler (that is, the instruction which can cause a branch, jump or other discontinuity in the instruction sequence), extends therebeyond, it (that is, the compiler) will sequence directly to step 94 to compile the program in a conventional manner. Similarly, returning to step 90, if the compiler makes a negative determination in that step, which will occur if the instruction being processed by the compiler is not an instruction which can cause a branch, jump or other discontinuity in the instruction sequence, it (that is, the compiler) will sequence directly to step 94 to compile the program in a conventional manner.

Figure 6:
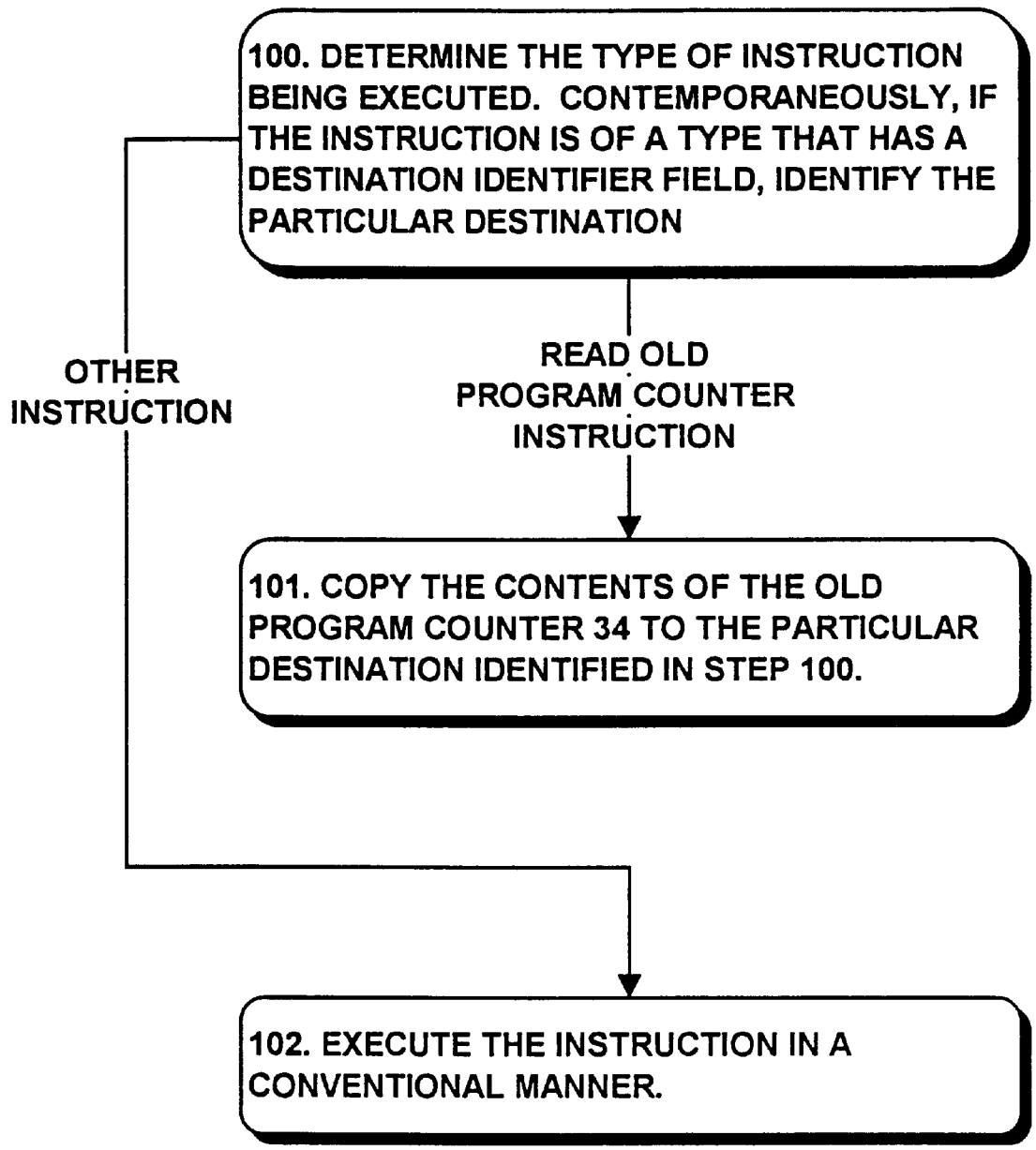
FIG. 6 is a flow diagram illustrating operations performed by the digital computer system in connection with execution of the read old program counter instruction depicted in FIG. 3.

FIG. 6 is a flowchart depicting operations performed by the microprocessor 11 in executing the read old program counter instruction 50. With reference to FIG. 6, when the microprocessor 11 (in particular, the control state machine 30, FIG. 1) begins execution of an instruction, in the INST DECODE phase, it will determine the type of instruction being executed, and branch based on the type of instruction (step 100). Contemporaneously, if the instruction is of a type that has a destination identifier field 52, the microprocessor 11 will identify the particular destination. If the microprocessor 11 determines in step 100 that the instruction is a read old program counter instruction 50, it will sequence to step 101 in which it copies the contents of the old program counter 34 to the particular destination identified by the destination identifier field 52. On the other hand, if microprocessor 11 determines in step 100 that the instruction is not a read old program control instruction 50, it will sequence to step 102 to execute the instruction in a conventional manner.

Figure 7:
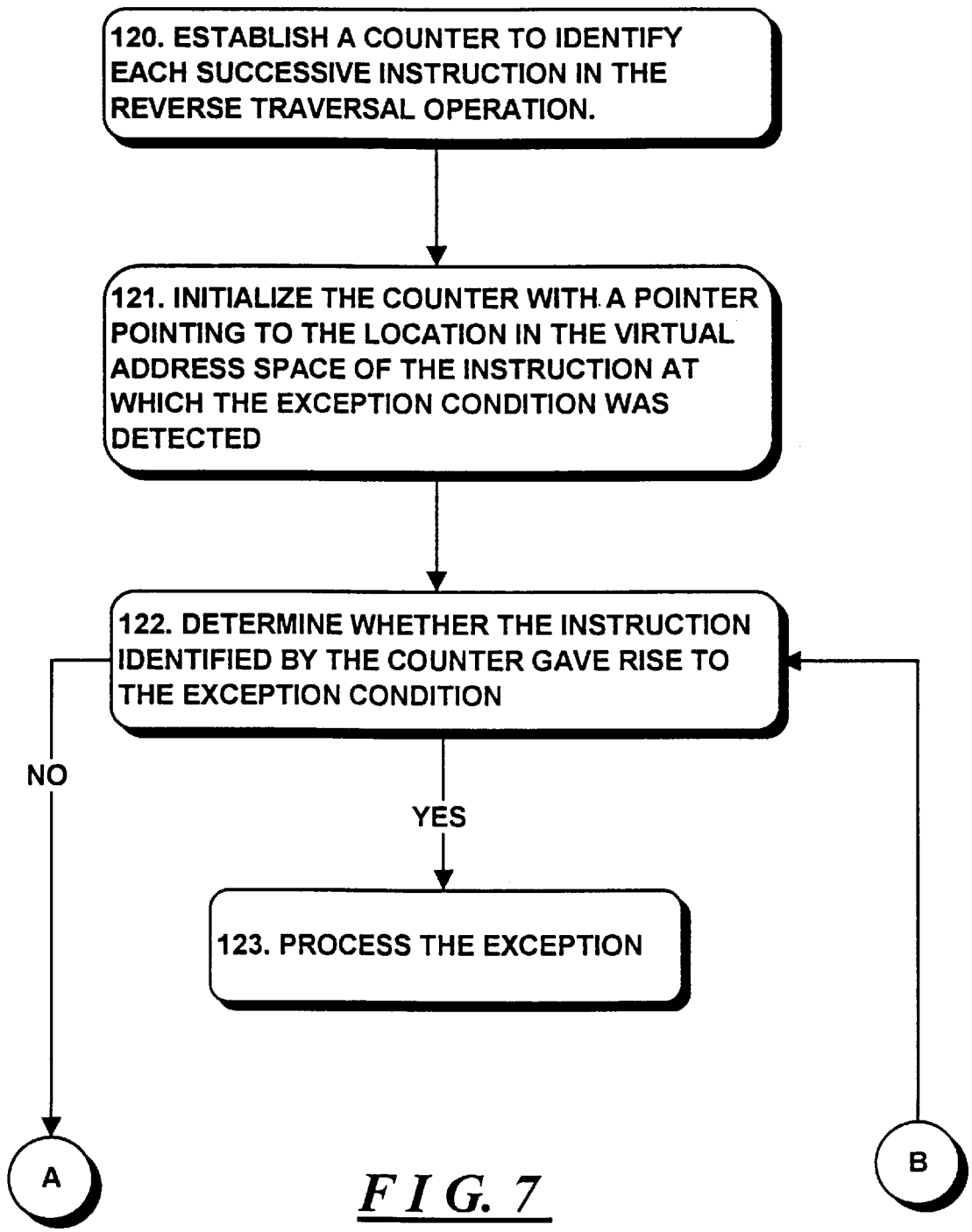
FIG. 7 is a flow diagram depicting operations performed by an exception handler in connection with processing of an exception, particularly directed to operations performed by the exception handler in connection with a read old program counter instruction

FIG. 7 is a flowchart depicting operations performed by the exception handler in connection with the reverse traversal of the instruction stream to locate the instruction which gave rise to the exception condition. With reference to FIG. 7, when an exception handler is performing a reverse traversal of the instruction stream, it will process successive instructions, from the one being processed at the point in time at which it is called, in reverse order in the instruction stream, to locate the instruction which gave rise to the exception condition. Initially, the exception handler will establish a counter (not separately shown) which it can use to identify each successive instruction in the reverse traversal operation (step 120). The counter may comprise a register in register set 20, or a register in the control and status registers 32 which may be provided for use by the exception handler. The exception handler initializes the counter with a pointer pointing to the location in the virtual address space of the instruction at which the exception condition was detected (step 121).

Thereafter, the exception handler will perform one or more iterations, each associated with an instruction processed during the reverse traversal operation. In each iteration, the exception handler will initially determine whether the identified instruction gave rise to the exception condition (step 122). If the identified instruction did give rise to the exception condition, that is, if the exception handler makes a positive determination in step 122, it, (that is, the exception handler) will process the exception in a conventional manner (step 123).

Returning to step 122, if the exception handler makes a negative determination in that step, which will occur if the instruction being processed did not give rise to the exception condition, it (that is, the exception handler) will determine whether the identified instruction is a read old program counter instruction (step 124). If the exception handler makes a negative determination in step 124, it will decrement the counter established in step 120, thereby to point to the preceding instruction in the instruction stream (step 125).

Returning to step 124, if the exception handler makes a positive determination in that step, which will occur if the instruction being processed is a read old program counter instruction, it (that is, the exception handler) will process the instruction to identify the destination identifier (step 126) and copy the contents of the register identified by the destination identifier to the counter established in step 120 (step 127). From the above, it will be apparent that the contents of the register identified by the destination identifier of the read old program control instruction point to the branch, jump or other instruction which gave rise to a discontinuity in the instruction execution sequence in the trap shadow for the instruction which gave rise to the exception condition. Accordingly, the operation performed in step 127 will enable the exception handler to return execution to the sequence including the instruction that gave rise to the exception condition. Following step 127, the exception handler will return to step 122 to process the instruction pointed to by the counter established in step 120.

The invention provides a number of advantages. In particular, it provides an arrangement for facilitating a branch, jump or other discontinuity in a trap shadow in a pipeline, without the need for stalling the pipeline prior to the point at which the discontinuity may occur, by providing an efficient mechanism by which an exception handler can traverse the instruction stream in a reverse direction to identify the instruction which gave rise to the exception condition after a discontinuity in the instruction stream.

It will be appreciated that numerous modifications may be made to the arrangement as described herein. For example, although the microprocessor 11 has been described as having a four-stage pipeline, it will be appreciated that the arrangement can be used in connection with microprocessors having pipelines of any number of stages, and which execute instructions in phases more complex than those described herein.

In addition, although the read old program counter instruction (FIG. 3) has been described as providing for copying of the contents of the old program counter 34 into a register in register set 20, it will be appreciated that the read old program counter instruction may enable the microprocessor 11 to copy the contents of the old program counter 34 to any storage location in the digital computer system 10, illustratively to a storage location in the memory subsystem 12.

Furthermore, although the arrangement has been described such that, when the read old program counter instruction is executed, the contents of the old program counter 34 will point to the virtual address space location of the instruction which enables the branch, jump or other discontinuity in the instruction stream, it will be appreciated that, depending on the point in the pipelined instruction execution at which the program counter is incremented, and the point at which the read old program counter instruction is actually executed, the old program counter 34 may actually point to a subsequent instruction (illustratively, INST(S+3), INST(S+4), . . . , in FIG. 4) in the instruction sequence that includes the instruction which enables the branch, jump or other discontinuity in the instruction stream. In that case, the contents of the old program counter 34 that are copied by the read old program counter instruction will still enable the exception handler, when called, to locate the instruction which gave rise to the exception condition, since they (that is, the contents) will point to an instruction in the continuous instruction sequence following the instruction which gave rise to the exception condition.

In addition, although the arrangement has been described in connection with a single branch, jump or other discontinuity in an instruction stream, it will be appreciated that the arrangement will find utility in connection with any number of branch, jump or other discontinuities which may occur in a trap shadow. In addition, the arrangement will find utility in connection with overlapping trap shadows.

Finally, although the arrangement obviates the restriction that, in no instruction in a trap shadow may enable a jump, branch, or similar discontinuity in the processing of the series of instructions in the instruction stream, it will be appreciated that the other restrictions in connection with trap shadows, namely, that (i) no instruction in the trap shadow may enable data to be stored in a register that is read in response to another instruction in the trap shadow; that is, no instruction in the trap shadow may have a destination identifier which identifies a register that is also identified by the source operand of another instruction in the trap shadow; and (ii) no two instructions in the trap shadow may enable data to be written to the same register; that is, no two instructions in the trap shadow may have destination identifiers which identify the same register, will still desirably be deserved. Similarly, it will be desired that no instruction in a trap shadow enable data to be written into the register or other location which is identified by the destination identifier of the read old program counter instruction. However, it will be appreciated that conventional register tracing operations may be used by a compiler, assembler or the like to ensure that these restrictions are observed.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A code generator for generating program code for execution by a digital computer, the program code comprising a sequence of instructions to be executed by said digital computer, the digital computer including (i) a plurality of storage locations, each identified by a storage location identifier, said instructions being stored in respective ones of said storage locations and (ii) an old program counter for storing a prior instruction storage location identifier identifying one of said storage locations containing one of said instructions executed by said digital computer prior to the one of the instructions currently being executed by said digital computer, the code generator comprising:

A. an instruction sequence discontinuity detector for determining whether an instruction in said sequence may give rise to a discontinuity in execution of said instruction sequence;
   B. a "branch taken" instruction sequence portion detector responsive to a positive determination by said instruction sequence discontinuity detector for identifying a "branch taken" portion of the instruction sequence; and
   C. a read old program counter instruction inserter for inserting into said "branch taken" instruction portion of the instruction sequence a read old program counter instruction thereby to enable said digital computer to copy the prior instruction storage location identifier from the old program counter to the one of said storage locations identified by the instruction of the read old program counter instruction type.

2. A code generator as defined in claim 1 in which said instruction of said read old program counter instruction type comprises an operation code identifying the instruction as being of the read old program counter instruction type and a destination identifier identifying one of said storage locations to which the prior instruction storage location identifier is to be copied.

3. A code generator as defined in claim 1 further comprising a trap shadow detector for determining whether a trap shadow extends beyond an instruction in said sequence which may give rise to a discontinuity in execution of said instruction sequence, the read old program counter instruction inserter conditioning insertion of said read old program counter instruction in said "branch taken" on a positive determination by said trap shadow detector.

4. A method for generating program code for execution by a digital computer, the program code comprising a sequence of instructions to be executed by said digital computer, the digital computer including (i) a plurality of storage locations, each identified by a storage location identifier, said instructions being stored in respective ones of said storage locations and (ii) an old program counter for storing a prior instruction storage location identifier identifying one of said storage locations containing one of said instructions executed by said digital computer prior to the one of the instructions currently being executed by said digital computer, the method comprising the steps of:

A. determining whether an instruction in said sequence may give rise to a discontinuity in execution of said instruction sequence;
   B. responsive to a positive determination during said instruction sequence discontinuity detecting step, identifying a "branch taken" portion of the instruction sequence; and
   C. inserting into said "branch taken" instruction sequence a read old program counter instruction thereby to enable said digital computer to copy the prior instruction storage location identifier from the old program counter to the one of said storage locations identified by the instruction of the read old program counter instruction type.

5. A method as defined in claim 4 in which said instruction of said read old program counter instruction type comprises an operation code identifying the instruction as being of the read old program counter instruction type and a destination identifier identifying one of said storage locations to which the prior instruction storage location identifier is to be copied.

6. A method as defined in claim 4 further comprising the step of determining whether a trap shadow extends beyond an instruction in said sequence which may give rise to a discontinuity in execution of said instruction sequence, the read old program counter instruction insertion step conditioning insertion of said read old program counter instruction in said "branch taken" on a positive determination during said trap shadow extension determination step.

7. A code generator computer program product for enabling a computer to generating program code for execution, the program code comprising a sequence of instructions to be executed by a digital computer, the digital computer including (i) a plurality of storage locations, each identified by a storage location identifier, said instructions being stored in respective ones of said storage locations and (ii) an old program counter for storing a prior instruction storage location identifier identifying one of said storage locations containing one of said instructions executed by said digital computer prior to the one of the instructions currently being executed by said digital computer, the code generator computer program product comprising a computer-readable medium having encoded thereon:

A. an instruction sequence discontinuity detector module for enabling the computer to determine whether an instruction in said sequence may give rise to a discontinuity in execution of said instruction sequence;
   B. a "branch taken" instruction sequence portion detector module for enabling the computer to, in response to a positive determination during processing of said instruction sequence discontinuity detector module, identify a "branch taken" portion of the instruction sequence; and
   C. a read old program counter instruction inserter module for enabling the computer to insert into said "branch taken" instruction portion of the instruction sequence a read old program counter instruction thereby to enable said digital computer to copy the prior instruction storage location identifier from the old program counter to the one of said storage locations identified by the instruction of the read old program counter instruction type.

8. A code generator computer program product as defined in claim 7 in which said instruction of said read old program counter instruction type comprises an operation code identifying the instruction as being of the read old program counter instruction type and a destination identifier identifying one of said storage locations to which the prior instruction storage location identifier is to be copied.

9. A code generator computer program product as defined in claim 7 further comprising a trap shadow detector module for enabling the computer to determine whether a trap shadow extends beyond an instruction in said sequence which may give rise to a discontinuity in execution of said instruction sequence, the read old program counter instruction inserter module enabling said computer to condition insertion of said read old program counter instruction in said "branch taken" on a positive determination during processing of said trap shadow detector module.

* * * * *